(12) United States Patent
Bhalgat et al.

(10) Patent No.: US 11,507,974 B2
(45) Date of Patent: Nov. 22, 2022

(54) PRESENTING AND ORDERING CONTENT ITEMS WITHIN A SCROLLABLE CONTENT UNIT TO A SOCIAL NETWORKING SYSTEM USER

(71) Applicant: Meta Platforms, Inc., Menlo Park, CA (US)

(72) Inventors: Anand Sumatilal Bhalgat, Mountain View, CA (US); Chinmay Deepak Karande, Mountain View, CA (US)

(73) Assignee: Meta Platforms, Inc., Menlo Park, CA (US)

(*) Notice: Subject to any disclaimer, the term of this patent is extended or adjusted under 35 U.S.C. 154(b) by 0 days.

(21) Appl. No.: 17/384,220

(22) Filed: Jul. 23, 2021

(65) Prior Publication Data
US 2021/0350411 A1    Nov. 11, 2021

Related U.S. Application Data

(63) Continuation of application No. 14/752,040, filed on Jun. 26, 2015, now Pat. No. 11,107,124.

(51) Int. Cl.
*G06Q 30/02* (2012.01)
*G06Q 50/00* (2012.01)

(52) U.S. Cl.
CPC ..... *G06Q 30/0255* (2013.01); *G06Q 30/0275* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 9,317,812 B2 | 4/2016 | Kabiljo et al. | |
| 9,729,495 B2 | 8/2017 | Yu et al. | |
| 10,395,321 B2 | 8/2019 | Shalita et al. | |
| 10,565,598 B2 | 2/2020 | Hegeman et al. | |

(Continued)

OTHER PUBLICATIONS

Lienhart et al. ("On the detection and recognition of television commercials," Proceedings of IEEE International Conference on Multimedia Computing and Systems, 1997, pp. 509-516, doi: 10.1109/MMCS.1997.609763 (Year: 1997).*

(Continued)

*Primary Examiner* — Christopher B Tokarczyk
(74) *Attorney, Agent, or Firm* — BakerHostetler

(57) ABSTRACT

A social networking system provides content items to a user via a feed that may include one or more sponsored content items. Multiple sponsored content items may be included in a set that is presented in the feed via a scrollable content unit that presents a sponsored content item from the set and presents additional sponsored content items from the set when user interaction is received. To place sponsored content items in the feed, the social networking system scores a set of sponsored content items based on prior user interactions with content presented via scrollable content units and a bid amount of a sponsored content item in the set. The set of sponsored content items is ranked among other sponsored content items based on its score. If the set of sponsored content items is selected for inclusion in the feed, the social networking system orders the sponsored content items in the set for presentation via the scrollable content unit.

20 Claims, 6 Drawing Sheets

(56) References Cited

U.S. PATENT DOCUMENTS

| | | | |
|---|---|---|---|
| 2011/0213669 A1* | 9/2011 | Vojnovic | G06Q 30/0275 |
| | | | 705/14.71 |
| 2012/0166532 A1 | 6/2012 | Juan et al. | |
| 2013/0151959 A1* | 6/2013 | Flynn, III | G06Q 50/01 |
| | | | 715/702 |
| 2013/0204710 A1* | 8/2013 | Boland | G06Q 50/01 |
| | | | 705/14.66 |
| 2014/0156744 A1 | 6/2014 | Hua et al. | |
| 2014/0214535 A1* | 7/2014 | Kee | G06Q 30/0275 |
| | | | 705/14.53 |
| 2015/0007101 A1* | 1/2015 | Lewis | G06F 3/0485 |
| | | | 715/784 |
| 2015/0100415 A1 | 4/2015 | Yu et al. | |
| 2015/0142571 A1* | 5/2015 | Moczydlowski | G06Q 30/0261 |
| | | | 705/14.58 |

OTHER PUBLICATIONS

U.S. Appl. No. 14/752,040, filed Jun. 26, 2015.
Lienhart R., et al., "On the Detection and Recognition of Television Commercials," Proceedings of IEEE International Conference on Multimedia Computing and Systems, 1997, pp. 509-516.

\* cited by examiner

PRESENTING AND ORDERING CONTENT ITEMS WITHIN A SCROLLABLE CONTENT UNIT TO A SOCIAL NETWORKING SYSTEM USER

CROSS REFERENCE TO RELATED APPLICATIONS

This application is a continuation of U.S. patent application Ser. No. 14/752,040, filed Jun. 26, 2015, which is incorporated by reference herein in its entirety.

BACKGROUND

This disclosure relates generally to social networking systems and in particular to presenting content to users of a social networking system.

A social networking system allows its users to connect to and to communicate with other users. Users may create profiles on a social networking system that are tied to their identities and include information about the users, such as interests and demographic information. The users may be individuals or entities such as corporations or charities. Because of the increasing popularity of social networking systems and the significant amount of user-specific information maintained by social networking systems, a social networking system allows users to easily communicate information about themselves to other users and share content with other users. For example, a social networking system provides content items to a user describing actions performed by other users of the social networking system who are connected to the user. Presenting users with content items describing interactions may increase user interaction with the social networking system.

Additionally, entities (e.g., a business) sponsor presentation of content items ("sponsored content" or "sponsored content items") via a social networking system to gain public attention for the entity's products or services, or to persuade social networking system users to take an action regarding the entity's products or services. Many social networking systems receive compensation from an entity for presenting social networking system users with certain types of sponsored content items provided by the entity. Frequently, social networking systems charge an entity for each presentation of sponsored content to an online system user (e.g., each "impression" of the sponsored content) or for each interaction with sponsored content by a social networking system user (e.g., each "conversion"). For example, a social networking system receives compensation from an entity each time a content item provided by the entity is displayed to a user on the social networking system or each time a user presented with the content item requests additional information about a product or service described by the content item by interacting with the content item (e.g., requests a product information page by interacting with the content item).

Social networking systems commonly present their users with a feed of content items including sponsored content items as well as content items selected for presentation to the users by the social networking system based on the content items and characteristics of the user As users of social networking systems more frequently access content via mobile devices or other devices with a limited display area, an social networking system may combine multiple content items into a scrollable content unit to reduce the display area in which content is presented without reducing the amount of content presented to users. For example, a feed of content presented on a mobile device may include a scrollable content unit including multiple content items and presenting a single content item to a user at one time. When a user interacts with the scrollable content unit, a different content item included in the scrollable content unit is presented to the user. This allows a social networking system to present multiple content items in a minimally obtrusive manner while increasing a number of content items capable of presentation to the user, which increases the number of opportunities for the social networking system to obtain revenue from entities in exchange for presenting content items. However, conventional scrollable content units typically do not account for differences in revenue obtained by the social networking system when positioning content items within the scrollable content unit, which may reduce compensation received by the social networking system for presenting sponsored content.

SUMMARY

A social networking system presents a feed of content items to a user. Content items presented via the feed include content items describing actions performed by users of the social networking system or content provided by users to the social networking system that the online system does not receive compensation for presenting (i.e., "organic" content items). Additionally, one or more content items for which the social networking system receives compensation for presenting ("sponsored content items") may be included in the feed of content items. In some embodiments, the feed includes at least one scrollable content unit, which is associated with a set of content items and includes a display area in which one or more of the content items in the set are presented. The scrollable content unit may be scrollable in a direction that is orthogonal to an orientation of the feed so additional content items from the set are displayed within the scrollable content unit the user navigates through the scrollable content unit. For example, if the feed is vertically oriented, the scrollable content unit is horizontally scrollable by the user. In this example, the display area of the scrollable content unit presents a different content item from the set of content item in response to the user performing one or more interactions with the scrollable content unit (e.g., when a user performs a horizontal gesture with a portion of a display device presenting the scrollable content unit). Because certain content items in a scrollable content unit are not presented until the user interacts with the scrollable content unit, content items that are not initially presented by the scrollable content unit may be more likely to receive subsequent interactions by a user, as the user has indicated an interest in content items in the scrollable content unit by navigating through the scrollable content unit to present the content items.

The social networking system receives sponsored content items, such as an advertisement, and selects one or more of the sponsored content items for inclusion in a feed of content for presentation to a user. In various embodiments, the social networking system generates a set of the sponsored content items for association with a scrollable content unit based on characteristics of the sponsored content items. For example, sponsored content items having a specific characteristic are included in the set. Alternatively, the set includes sponsored content items having at least a threshold number of common characteristics. Each sponsored content item is associated with a bid amount that specifies a maximum amount of compensation the social networking system receives from a third party system associated with a sponsored content item for presenting the sponsored content item or for an interaction with the sponsored content item by a user presented with the sponsored content item. Based at least in part on the bid amounts associated with sponsored content items, the social networking system scores various sponsored content items.

In one embodiment, sponsored content items included in a set associated with a scrollable content unit are differently scored than individual sponsored content items. For example, the social networking system retrieves information associated with the user describing prior interactions by the user with sponsored content items, or other content items, previously presented to the user via other scrollable content units. Based on the retrieved information, the social networking system generates an adjustment value associated with the set of sponsored content items associated with the scrollable content unit and determines a score for the set of sponsored content items associated with the scrollable content unit based at least in part on the adjustment value. In one embodiment, the social networking system modifies a bid amount associated with a sponsored content item from the set to be initially displayed by the scrollable content unit by the adjustment value and determines the score for the set of sponsored content items based on the modified bid amount. Based on the score for the set of sponsored content items and the scores for other sponsored content items, the social networking system selects content items for presentation to the user via the feed, as well as positions of the selected content items within the feed.

If the set of sponsored content items associated with the scrollable content unit is selected for presentation via the feed based on the score associated with the set of sponsored content items, the social networking system orders the set of sponsored content items for presentation by the scrollable content unit. In various embodiments, the social networking system generates scores for each sponsored content item in the set, other than the content item to be initially presented by the display area of the scrollable content unit, based at least in part on bid amounts of the sponsored content items in the set. The social networking system may associate discount factors with positions in the scrollable content units relative to the display area to account for different likelihoods of users interacting with content items different positions from the display area. For example, the user is less likely to interact with content items in positions farther from the display area in positions nearer to the display area, so higher discount factors are applied to positions farther from the display area. The online system accounts for the discount factors associated with various positions and bid amounts associated with sponsored content items when scoring sponsored content items in the set. Based on the bid amounts of the sponsored content items in the set and the discount factors, the social networking system orders the set of sponsored content items. For example, the social networking system orders the set of candidate content items to maximize a sum of products of bid amounts of sponsored content items in the set and corresponding discount factors.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

System Architecture

Figure 1:
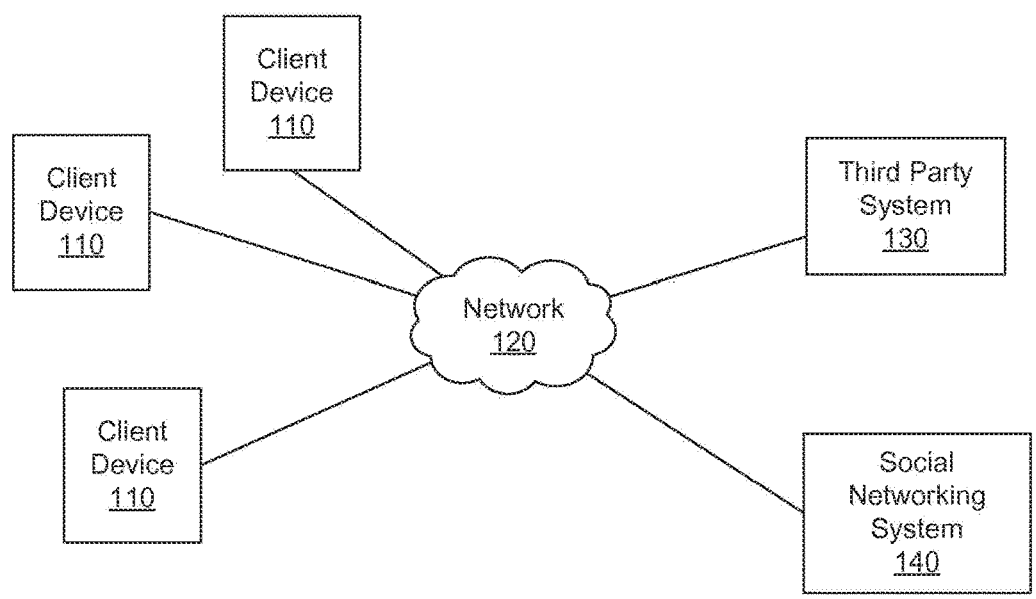
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems other than social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisement requests, content, description of actions performed by social networking system users via the third party system 130, or information about an application provided by the third party system 130.

Figure 2:
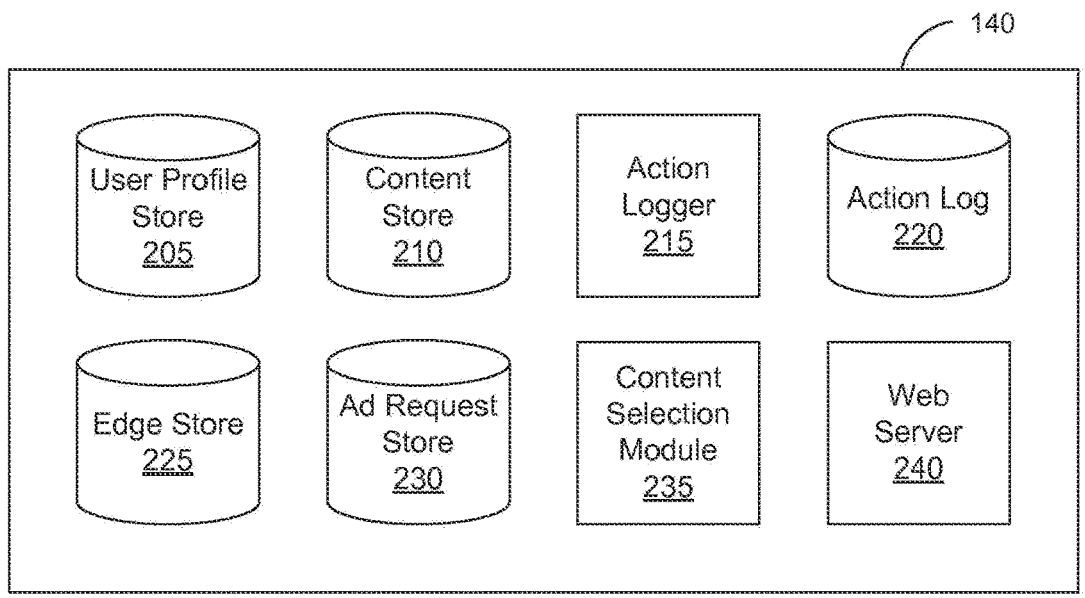
FIG. 2 is a block diagram of a social networking system, in accordance with an embodiment.

FIG. 2 is a block diagram of an architecture of the social networking system 140. The social networking system 140 shown includes a user profile store 205, a content store 210, an action logger 215, an action log 220, an edge store 225, an advertisement request ("ad request") store 230, a content selection module 235, and a web server 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system 140 using a brand page associated with the entity's user profile. Other users of the social networking system 140 may connect to the brand page to receive information posted to the brand page or to receive information from the brand page. A user profile associated with the brand page may include information about the entity itself, providing users with background or informational data about the entity.

The content store 210 stores object that each represents various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the social networking system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or in another user in the social networking system 140 based on the actions performed by the user. A user's affinity may be computed by the social networking system 140 over time to approximate the user's interest in an object, in a topic, or in another user in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An advertisement request includes advertisement content, also referred to as an "advertisement," and a bid amount. The advertisement is text, image, audio, video, or any other suitable data presented to a user. In various embodiments, the advertisement also includes a landing page specifying a network address to which a user is directed when the advertisement is accessed. The bid amount is associated with an ad request by an advertiser and is used to determine an expected value, such as monetary compensation, provided by an advertiser to the social networking system 140 if advertisement content in the ad request is presented to a user, if the advertisement content in the ad request receives a user interaction when presented, or if any suitable condition is satisfied when advertisement content in the ad request is presented to a user. For example, the bid amount specifies a monetary amount that the social networking system 140 receives from the advertiser if advertisement content in an ad request is displayed. In some embodiments, the expected value to the social networking system 140 of presenting the advertisement content may be determined by multiplying the bid amount by a probability of the advertisement content being accessed by a user Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information (e.g. demographics), edges or actions satisfying at least one of the targeting criteria. Hence, targeting criteria allow an advertiser to identify users having specific characteristics, simplifying subsequent distribution of content to different users.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges, or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the social networking system 140. Targeting criteria may also specify interactions between a user and objects performed external to the social networking system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows advertisers to further refine users eligible to be presented with advertisement content from an advertisement request. As another example, targeting criteria identifies users having a connection to another user or object or having a particular type of connection to another user or object.

The content selection module 235 selects one or more content items for communication to a client device 110 to be presented to a user. Content items eligible for presentation to the user are retrieved from the content store 210, from the ad request store 230, or from another source by the content selection module 235, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 235 includes content items eligible for presentation to the user in one or more selection processes, which identify a set of content items for presentation to the viewing user. For example, the content selection module 235 determines measures of relevance of various content items to the user based on characteristics associated with the user by the social networking system 140 and based on the user's affinity for different content items. Based on the measures of relevance, the content selection module 235 selects content items for presentation to the user. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items eligible for presentation to the user may include ad requests or other content items associated with bid amounts. The content selection module 235 uses the bid amounts associated with ad requests when selecting content for presentation to the viewing user. In various embodiments, the content selection module 235 determines an expected value associated with various ad requests (or other content items) based on their bid amounts and selects content items associated with a maximum expected value or associated with at least a threshold expected value for presentation. An expected value associated with an ad request or with a content item represents an expected amount of compensation to the social networking system 140 for presenting an ad request or a content item. For example, the expected value associated with an ad request is a product of the ad request's bid amount and a likelihood of the user interacting with the ad content from the ad request. The content selection module 235 may rank ad requests based on their associated bid amounts and select ad requests having at least a threshold position in the ranking for presentation to the user. In some embodiments, the content selection module 235 ranks both content items not associated with bid amounts and ad requests in a unified ranking based on bid amounts associated with ad requests and measures of relevance associated with content items and ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

For example, the content selection module 235 receives a request to present a feed of content to a user of the social networking system 140. The feed may include one or more advertisements as well as content items, such as stories describing actions associated with other online system users connected to the user. The content selection module 235 accesses one or more of the user profile store 205, the content store 210, the action log 220, and the edge store 225 to retrieve information about the user. For example, information describing actions associated with other users connected to the user or other data associated with users connected to the user are retrieved. Additionally, one or more advertisement requests ("ad requests") may be retrieved from the ad request store 230. The retrieved stories, ad requests, or other content items, are analyzed by the content selection module 235 to identify candidate content items, including ad requests, eligible for presentation to the user. For example, content items associated with users who are not connected to the user or stories associated with users for whom the user has less than a threshold affinity are discarded as candidate content items. Based on various criteria, the content selection module 235 selects one or more of the content items or ad requests identified as candidate content for presentation to the identified user. The selected content items or advertisements from selected ad requests are included in a feed of content that is presented to the user. For example, the feed of content includes at least a threshold number of content items describing actions associated with users connected to the user via the social networking system 140.

In various embodiments, the content selection module 235 presents content to a user through a newsfeed including a plurality of content items selected for presentation to the user. One or more advertisements may also be included in the feed. The content selection module 235 may also determine the order in which selected content items or advertisements are presented via the feed. For example, the content selection module 235 orders content items or advertisements in the feed based on likelihoods of the user interacting with various content items or advertisements.

When generating a feed of content items for presentation to a user, the content selection module 235 may generate one or more scrollable content units for inclusion in the feed along with content items in various embodiments. A scrollable content unit includes a display area and an ordered set of content items. One or more interactions are associated with the scrollable content unit to allow a user to modify the content item from the ordered set presented by the display area, allowing the user to navigate through the ordered set of content items. In various embodiment, when modifying the content item presented in the display area, the scrollable content unit scrolls in a direction that is orthogonal to an orientation of the feed of content in which the scrollable content unit is presented. For example, a scrollable content unit provided in a feed of content having a vertical orientation is scrollable in a horizontal direction. In various embodiments, content items in the ordered set each have a common characteristic. For example, the ordered set of content items includes advertisements from ad requests associated with a common advertising campaign or content items associated with a common subject or topic. In some embodiments, the content selection module 235 identifies a set of ad requests having one or more common characteristics to associate with a scrollable content unit by applying one or more machine learning models ad requests from the ad request store 230. Different scrollable content units may be associated with different numbers of ad requests. Certain ad requests may be excluded from inclusion in a set associated with a scrollable content unit. For example, an ad request includes a value indicating whether the ad request is eligible to be included in a set associated with a scrollable content unit, and the content selection module 235 excludes the ad request from inclusion in sets associated with scrollable content unit if the value indicates the ad request is not eligible for inclusion in a set. The advertiser associated with the ad request may specify the value indicating whether the ad request is eligible to be included in a set associated with a scrollable content unit when the ad request is provided to the social networking system 140, and may modify the value after the ad request is stored by the social networking system 140.

A set associated with a scrollable content unit may include ad requests having any suitable common characteristic. For example, ad requests include an objective specifying a desired action for a user presented with advertisements included in the ad request, and a set associated with a scrollable content unit includes ad requests having a common objective. Example objectives include: sharing an advertisement with other users, expressing a preference for an advertisement, providing a comment on an advertisement, accessing content associated with the advertisement, installing an application associated with the advertisement, purchasing a product or service associated with the advertisement, or any other suitable action associated with the advertisement. Alternatively, the set associated with the scrollable content unit includes ad requests associated with a common advertiser, ad requests included in a common advertising campaign, ad requests associated with a common topic (e.g. shopping, dining, services, travel), ad requests with common content in their advertisements (e.g., image, video, text, and sizes of text, image or video data), advertisements with a common language used in their advertisements (e.g. English, Spanish, German), or ad requests having any other suitable common characteristic or characteristics. In various embodiments, the content selection module 235 differently weights characteristics of ad requests when generating a set associated with a scrollable content unit. For example, the content selection module 235 determines weights associated with various characteristics of ad requests based on training sets including prior presentation of sets of advertisements from ad requests having various characteristics to social networking system users and interactions with the advertisements previously presented by the scrollable content unit. In some embodiments, the content selection module 235 identifies a characteristic having at least a threshold weight or at least a threshold position in a ranking of characteristics based on weights and generates a set of ad requests having a common value for the identified characteristic. Prior interactions with previously presented scrollable content units by of a user to be presented with a feed including a scrollable content unit may be used along with characteristics of ad requests eligible for presentation to the user to determine a set of ad requests associated with the scrollable content unit. For example, if the user more frequently performs certain types of interactions with scrollable ad units including advertisements from ad requests having certain characteristics (e.g., ad requests associated with a particular topic), the content selection module 235 uses the certain characteristics when generating a set of ad requests associated with a scrollable content unit. Hence, user-specific information may be used along with characteristics of ad requests to generate a set. Multiple training sets may be used in some embodiments to improve the accuracy of the weights associated with various characteristics of ad requests.

When a user interacts with the scrollable content unit, an advertisement presented in the display area of the scrollable content unit changes. In some embodiments, the scrollable content unit scrolls in a direction orthogonal to an orientation of the feed of content item when the user interacts with the scrollable content unit. For example, if the scrollable content unit is presented in a vertically-oriented feed of content items, the scrollable content unit horizontally scrolls through advertisements in the set based on user interactions with the scrollable content unit. In various embodiments, the content selection module 235 identifies an initial advertisement from the set of ad request associated with a scrollable content unit for presentation in the display area when the scrollable content unit is initially presented and subsequently determines an order associated with other ad request in the set to determine an order in which the scrollable content unit navigates through the ad requests in the set in response to user interactions.

To determine whether to present advertisements from a set of ad requests associated with a scrollable content unit, the content selection module 235 accounts for the user's prior interaction with content previously presented by a scrollable content unit and determines an adjustment value that is combined with a bid amount or other score of an ad request including the advertisement to initially be presented by the scrollable content unit to determine a score for the set of ad requests associated with the scrollable content unit. For example, the social networking system retrieves information from the action log 220 describing prior actions by the user with advertisements, or other content items, previously presented to the user via other scrollable content units. Based on the retrieved information, the content selection module 235 generates the adjustment value associated with the set of ad requests associated with the scrollable content unit. Based on the adjustment value and the bid amount included in the ad request that includes the advertisement in the set to be initially presented by the scrollable content unit, the content selection module 235 generates a score for the set of advertisements associated with the scrollable content unit. For example, the content selection module 235 increases a score for the ad request including the advertisement to be initially presented by the adjustment value. In some embodiments, the score for the ad request is a bid amount of the ad request including the advertisement to be initially presented by the scrollable content unit, so the content selection module 235 increases the bid amount of the ad request including the advertisement to be initially presented by the scrollable content unit by the adjustment value. In some embodiments, the adjustment value is a percentage by which the score of the ad request including the advertisement to be initially presented by the scrollable content unit is modified; alternatively the adjustment value is a quantity added to or otherwise combined with the score of the ad request including the advertisement to be initially presented by the scrollable content unit. Determining an adjustment value associated with a set of ad requests is further described below in conjunction with FIG. 3. The content selection module then ranks ad requests and the set of ad requests associated with the scrollable content unit based on their associated scores, as described above, and selects ad requests from which advertisements are presented to the user.

If the content selection module 235 selects the set of ad requests associated with the scrollable content unit for presentation to the user, the content selection module 235 also determines an order of the set of ad requests. While the advertisement initially presented by the scrollable content unit is determined, the order in which advertisements from other ad requests in the set are presented is not specified when the set of ad requests is selected for presentation. The content selection module 235 may associate discount factors with different positions in a scrollable content unit relative to the scrollable content unit's display area to account for different likelihoods of users interacting with content items in different positions from the display area. For example, the user is less likely to interact with content items in positions farther from the display area than in positions nearer to the display area, so higher discount factors are applied to positions farther from the display area.

In various embodiments, the content selection module 235 determines discount factors associated with various positions in the scrollable content unit based on prior interactions by the user with advertisements, or other content items, previously presented to the user via scrollable content units. For example, the content selection module 235 determines certain types of interactions by the user with advertisements previously presented to the user via different positions of scrollable content units and determines the discount factors associated with positions of the scrollable content unit based on the number of or frequency with which the user performed various interactions with advertisements previously presented in different positions of scrollable content units. The content selection module 235 may use one or more machine-learned models to determine discount factors for positions of scrollable content units. In some embodiments, the content selection module 235 accounts for characteristics of the ad requests previously presented to the user in scrollable content units and characteristics of the ad requests included in the set when determining the discount factors. This allows the discount factors to account for differences in user interactions with ad requests having different characteristics. Additionally, information describing presentation of the scrollable content unit and previously presented scrollable content units may also be used by the content selection module 235 to determine the discount factors. For example, interactions with scrollable content units previously presented during a same time of day as the scrollable content unit or interactions with scrollable content units previously presented to the user via a type of client device 110 matching a type of the client device 110 presenting the scrollable content unit, or interactions with scrollable content units presented to the user via an application used to present the scrollable content unit are used to determine the discount factors for various positions of the scrollable content unit.

Based on scores associated with ad requests included in the set and discount factors associated with positions in the scrollable content unit, the content selection module 235 orders the set of ad requests associated with the scrollable content unit. In one embodiment, the content selection module 235 orders the set of ad requests to maximize a combination of scores associated with ad requests in the set after application of discount factors to the scores. For example, the content selection module 235 differently orders the set of ad requests where higher positions in the order correspond to positions in the scrollable content unit nearer to the display area. Hence, an ad request in the highest position in the order corresponds to a position in the scrollable content unit nearest to the display area. Discount factors corresponding to positions in the scrollable content unit are applied to bid amounts or scores of ad requests based on the ad requests' position in the order. For example, the position discount associated with a position nearest to the display area is applied to a score of an ad request having a highest position in the order and a position discount associated with a second position from the display area is applied to a score of an ad request having a second position in the order. The content selection module 235 combines the scores or bid amounts of the set of ad requests in the order after application of the discount factors to the scores or bid amounts. An order of the set of ad requests resulting in a maximum combination of scores of bid amounts after application of the discount factors is then selected by the content selection module 235 and associated with the scrollable content unit for presentation, as further described below in conjunction with FIG. 3.

In various embodiments, the content selection module 235 determines whether a user interacts with advertisements presented via the scrollable content unit based on information received from a tracking mechanism (e.g., a tracking pixel) included in the advertisements. A tracking mechanism communicates information identifying an interaction with an advertisement from the user matching an interaction identified by the tracking mechanism. For example, a tracking mechanism indicates an advertisement was viewed when the advertisement is presented in the feed of content for at least a threshold amount of time. In various embodiments, the social networking system 140 or an advertiser associated with the advertisement specify one or more interactions identified by a tracking mechanism. Information from the tracking mechanism identifies the interaction with the advertisement, the advertisement, a time when the advertisement occurs, and the user who performed the advertisement, which is communicated to the action log 220 for association with the user and with the advertisement. Additionally, information from the tracking mechanism may indicate a position in a scrollable content unit associated with the advertisement.

The web server 240 links the social networking system 140 via the network 120 to the one or more client devices 110, as well as to the one or more third party systems 130. The web server 240 serves web pages, as well as other web-related content, such as JAVA®, FLASH®, XML and so forth. The web server 240 may receive and route messages between the social networking system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that is stored in the content store 210. Additionally, the web server 240 may provide application programming interface (API) functionality to send data directly to native client device operating systems, such as IOS®, ANDROID™, WEBOS®, or BlackberryOS.

Figure 3:
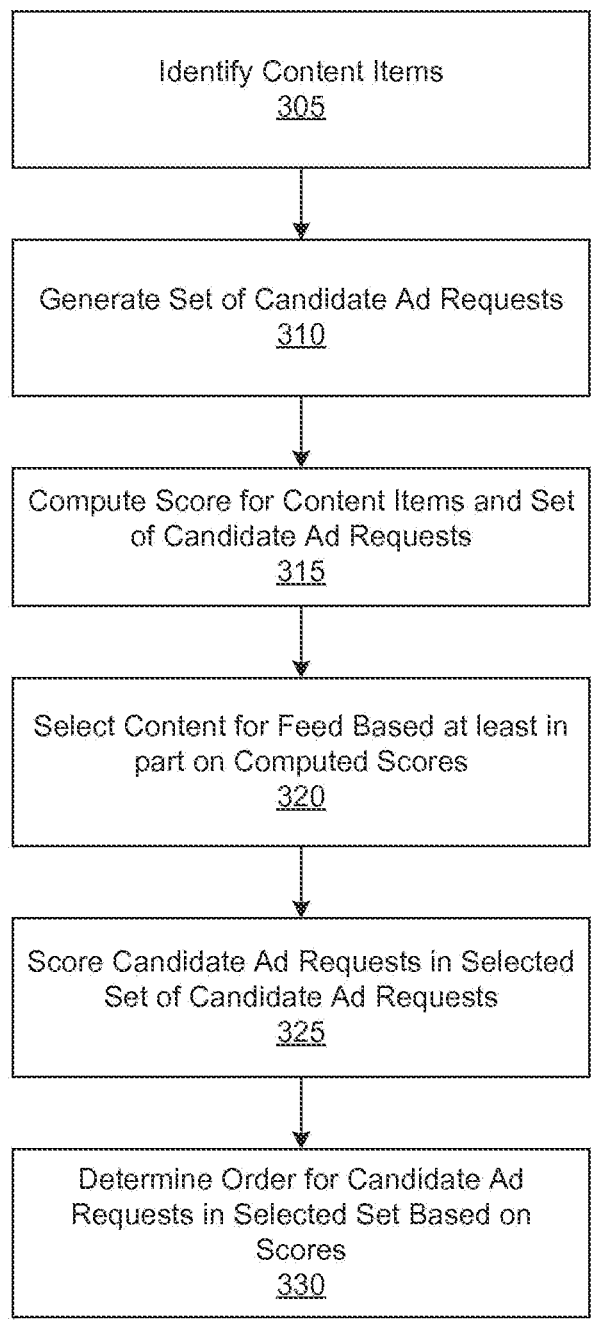
FIG. 3 is a flowchart of a method for selecting and ordering sponsored content items for presentation in a scrollable content unit presented to a social networking system via a feed, in accordance with an embodiment.

Generating Scrollable Content Units Including Sponsored Content Items for Presentation Via a Feed FIG. 3 is a flowchart of one embodiment of a method for selecting and ordering sponsored content items (such as advertisements) for presentation in a scrollable content unit presented to a social networking system user via a feed. In various embodiments, the method may include different and/or additional steps than those identified in conjunction with FIG. 3. Additionally, in some embodiments, steps of the method may be performed in different orders than the order described in conjunction with FIG. 3.

The social networking system 140 receives a request for a feed of content to present to a user of the social networking system 140 and identifies 305 content items eligible for presentation to the user via the feed. For example, the social networking system 140 receives a request to refresh a feed of content presented to the user or receives a request to present a feed of content to the user. In response to receiving the request, the social networking system 140 identifies 305 content items eligible for presentation to the user. For example, the social networking system 140 identifies 305 content items describing actions performed by additional users connected to the user via the social networking system 140 or content items provided to the social networking system 140 by additional users connected to the user via the social networking system 140. Additionally, the social networking system 140 identifies 305 ad requests including at least a threshold number of targeting criteria satisfied by characteristics of the user as eligible for presentation to the user.

Figure 4A:
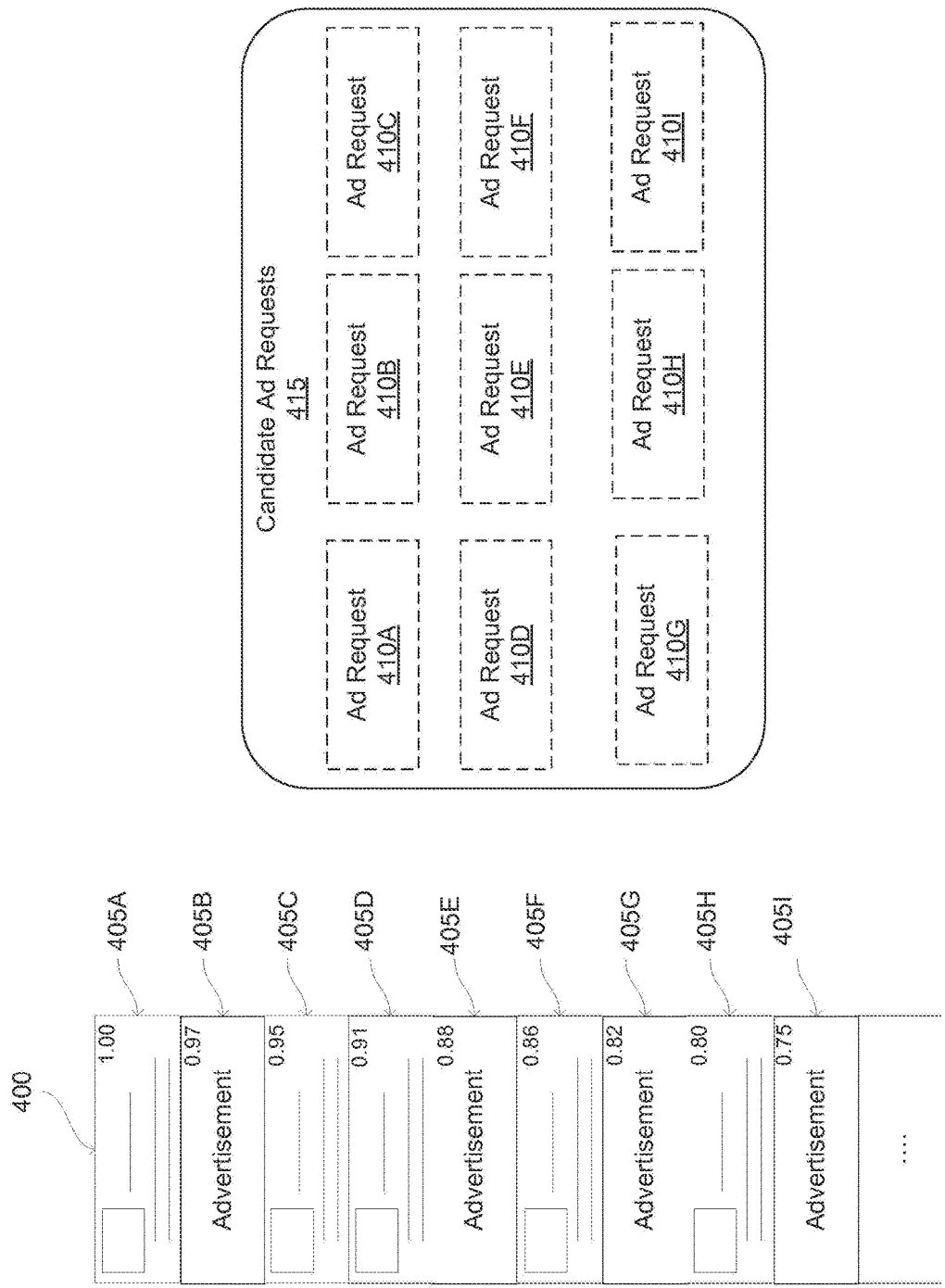
FIG. 4A is an example feed of content for presentation to a social networking system user and candidate advertisement requests eligible for presentation via the feed, in accordance with an embodiment.

Referring to FIG. 4A, an example feed 400 of content for presentation to a user is illustrated. As shown in FIG. 4A, the feed 400 includes multiple positions 405A-405I (also referred to individually and collectively using reference number 405) in which content items are presented. Certain positions 405A may be allocated for presentation of sponsored content items via the feed 400. For example, in FIG. 4A, positions 405B, 405E, 405G, 405I are allocated for presentation of sponsored content items, while the remaining positions 405 are used to present content items describing actions associated with other social networking system users or other content items for which the social networking system 140 does not receive compensation in exchange for presenting.

In various embodiments, the social networking system 140 accounts for differences in user interaction with content items presented in different positions 405 of the feed 400 by associating a position discount with each position 405. A position discount associated with a position 405 in the feed 400 and reflects a predicted decrease in user interaction with a content item presented in the position 405 of the feed 400. In FIG. 4A, a position discount associated with a position 405 is identified in the position 405; for example, position 405A is associated with a position discount of 1.00, while position 405E is associated with a position discount of 0.88. When the feed 400 of is presented to the user, the likelihood of the user interacting with a content item presented via the feed 400 varies depending on the position 405 in the feed 400 in which the content item is presented. Positions 405 of content items within the feed 400 may be determined based on a distance between the content item and a reference position, such as an upper boundary of the feed of content items (e.g., position 405A in FIG. 4A). For example, the user has a higher likelihood of interacting with content items presented in positions within a threshold distance from an upper boundary (or "top") of the feed 400 than of interacting with content items presented in positions greater than the threshold distance from the upper boundary of the feed 400. The position discount associated with a position 405 in the feed 400 may be based at least in part on a distance between the position and a reference position in the feed 400, such as the upper boundary of the feed 400. For example, different position discounts are associated with different distances from the upper boundary of the feed of content items, so a distance between a position 405 and the upper boundary of the feed 400 determines the position discount applied to a score or other measure of relevance associated with a content item presented in the position 405. Determining a position discount value associated with a position 405 in a feed 400 is further described in U.S. patent application Ser. No. 14/049,429, filed on Oct. 9, 2013, and in U.S. patent application Ser. No. 14/675,009, filed on Mar. 31, 2015, which are each hereby incorporated by reference in their entirety.

When a request for the feed 400 is received from a user, the social networking system 140 identifies 305 content items for which the social networking system 140 does not receive compensation in exchange for presenting that are eligible for presentation to the user as well as advertisement requests ("ad requests") eligible for presentation to the user. Ad requests including at least a threshold number of targeting criteria satisfied by characteristics of the user or ad requests that do not include targeting criteria are identified 305 as eligible for presentation to the user. Ad requests eligible for presentation to the user are also referred to herein as "candidate ad requests." FIG. 4A shows ad requests 410A-410H as candidate ad requests 415.

From the candidate ad requests, the social networking system 140 generates 310 one or more sets of candidate ad requests, with a set of candidate ad requests including candidate ad requests having at least one common characteristic. As described above in conjunction with FIG. 2, the social networking system 140 may apply one or more machine learned models to the candidate ad requests to generate 310 one or more sets of candidate ad requests. Prior interactions by the user with advertisements from ad requests having characteristics matching or similar to characteristics of the candidate ad requests may be used by the social networking system 140 to generate 310 one or more sets of candidate ad requests. The social networking system 140 associates a set of candidate ad requests with a scrollable content unit for display in the feed.

Figure 4B:
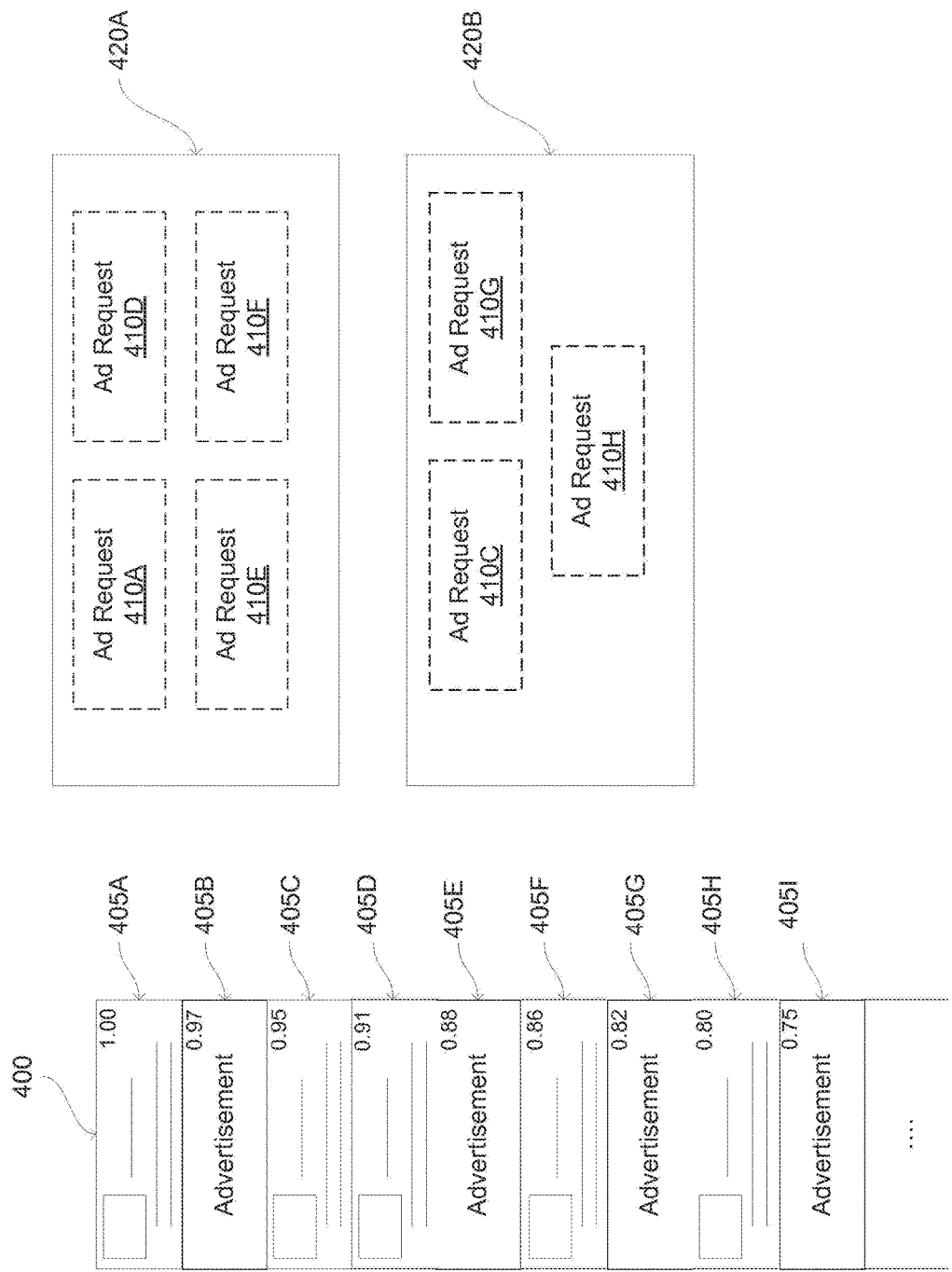
FIG. 4B is an example feed of content for presentation to a social networking system user and sets of candidate advertisement requests eligible for presentation via the feed, in accordance with an embodiment.

FIG. 4B shows example sets of candidate ad requests generated 310 by the social networking system 140. In FIG. 4B, set of candidate ad requests 420A includes ad requests 410A, 410D, 410DE, 410F and set of candidate ad requests 420B includes ad requests 410C, 410G, 410H. For example, ad requests 410A, 410D, 410DE, 410F are each associated with a topic of "food," so they are included in set of candidate ad requests 420A. Similarly, in the example of FIG. 4B, ad requests 410C, 410G, 410H are each associated with a topic of "travel," causing the social networking system 140 to include them in set of candidate ad requests 420B. Candidate ad requests that do not have a characteristic, or that do not have a specific characteristic, common with other candidate ad requests are not included in a set of candidate ad requests. Similarly, candidate ad requests including a value indicating they are not eligible for inclusion in a set of candidate ad requests are not included in a set of candidate ad requests.

The online system 140 computes 315 scores for identified content items as well as for the set of candidate ad requests. As described above in conjunction with FIG. 2, a score for a content item may be computed 315 based on measures of relevance of the candidate content item to the user. Additionally, for a content item including a bid amount (e.g., an ad request), the online system 140 computes 315 the score for the content item based on the bid amount, and may also account for a measure of relevance of the content item to the user, as described above in conjunction with FIG. 2. To compute 315 a score for a set of candidate ad requests, the social networking system 140 identifies an initial ad request from the set of candidate ad requests. An advertisement from the initial ad request is initially presented in a display area of the scrollable content unit associated with the set of ad requests. In some embodiments, the social networking system 140 identifies the initial ad requests based on characteristics of the ad requests in the set and information associated with the user, such as prior interactions by the user with previously presented advertisements. For example, the social networking system 140 identifies the initial ad request as an ad request from the set that includes an objective of an action that the user has performed most often within a time interval form a current time or identifies the initial ad request as an ad request from the set including one or more topics with which the user has at least a threshold affinity. Alternatively, the social networking system 140 identifies the initial ad request from the set as an ad request associated with an advertiser or entity with which the user has a maximum affinity relative to advertisers associated with other ad requests in the set or as an ad request associated with a product or service with which the user has a maximum affinity. In various embodiments, the social networking system 140 applies one or more machine learned models to characteristics of ad requests in the set and characteristics of the user (e.g., demographic information, actions, connections with other users or objects) to identify the initial ad request from the set. For example, in FIG. 4B, the social networking system 140 identifies ad request 410A as an initial ad request from set of candidate ad requests 420A and identifies ad request 410G as an initial ad request from set of candidate ad requests 420B.

Because the set of candidate ad requests is associated with a scrollable content unit, the social networking system 140 accounts for the multiple advertisements from the set of candidate ad requests with which the user may interact via the scrollable content unit when computing 315 the score for the set of candidate ad requests. To account for possible user interaction with various advertisements from the set of candidate advertisements, the social networking system 140 determines an adjustment value based on prior interactions by the user with content items, such as advertisements, previously presented to the user via scrollable content units. Hence, the adjustment value is based on an expected amount of interaction by the user with various advertisements from the set of candidate ad request based on prior interaction by the user with various content items previously presented via scrollable content units. For example, the social networking system 140 retrieves prior interactions by the user with advertisements presented via a scrollable content unit and determines an average number of advertisements presented via a scrollable content unit with which the user performed one or more types of interactions. In some embodiments, the social networking system 140 receives prior interactions by the user with advertisements from ad requests having at least a threshold number or percentage of characteristics matching characteristics of ad requests in the set of candidate ad requests that were previously presented to the user via scrollable content units. Based on the retrieved interactions by the user with content items included in previously presented scrollable content units, the social networking system 140 determines the adjustment value.

In some embodiments, the social networking system 140 computes 315 the score for the set of candidate ad requests based on the adjustment value and the bid amount of the initial ad request from the set of candidate ad requests. For example, the adjustment value is a percentage and the social networking system 140 computes 315 the score for the set of candidate ad requests by increasing the bid amount of the initial ad request by the percentage. The social networking system 140 may also account for a measure of relevance of the initial ad request to the user when computing 315 the score for the set of candidate ad requests by combining the measure of relevance of the initial ad request to the user with the bid amount of the initial ad request increased by the adjustment value. Alternatively, the adjustment value may be determined as a factor that is applied to the bid amount of the initial ad request from the set of candidate ad requests to determine 315 the score for the set of candidate ad requests. In other embodiments, the social networking system 140 determines an average bid amount of the ad requests in the set of candidate ad requests and applies the adjustment value to the average bid amount to determine 315 the score for the set of candidate ad requests. Additionally, in some embodiments, the social networking system 140 may determine the adjustment value prior to identifying the initial ad request from the set of candidate ad requests.

Referring to FIG. 4B, ad request 410A, which is the initial ad request from set of candidate ad requests 420A has a bid amount of $0.80. Additionally, in the example of FIG. 4B, the social networking system 140 has determined an adjustment value of 50% for sets of candidate ad requests based on prior interactions by the user with advertisements previously presented via scrollable content units. Thus, when calculating 315 the score for set of candidate ad requests 420A, the social networking system 140 increases the bid amount of ad request 410A by the adjustment value of 50%, resulting in a score for set of candidate ad requests 420A of ($0.80) (1.50), or $1.20. Similarly, in FIG. 4B, ad request 410G, the initial ad request from set of candidate ad requests 420B, has a bid amount of $0.60. Applying the adjustment value to the bid amount of ad request 410G causes the social networking system 140 to calculate a score of ($0.60)(1.50), or $0.90, for set of candidate ad requests 420B.

Based at least in part on scores for content items, including ad requests, and scores for one or more sets of candidate ad requests, the social networking system 140 selects 320 content for inclusion the feed for presentation to the user. As described above in conjunction with FIG. 2, the social networking system 140 may rank content items, ad requests, and sets of ad requests in a unified ranking based at least in part on their scores and select 320 ad requests, content items, or sets of ad requests having at least a threshold position in the ranking for inclusion in the feed. When selecting 320 content for inclusion in the feed, the social networking system 140 also determines an order in which the content is presented by the feed based on scores associated with content items, ad request, and sets of ad requests as well as position discounts associated with various positions in the feed. Additionally, the social networking system 140 may enforce one or more advertising policies when selecting content 320 that regulate the number or position of advertisements in the feed to increase a likelihood of the feed including content relevant to the user. For example, advertising policies prevent presentation of advertisements in certain positions of the feed, specify a minimum number of content items presented in the feed between advertisements, specify a minimum distance (e.g., number of positions) between a pair of advertisements in the feed, or specify other criteria to regulate an amount of advertisements presented in the feed.

Figure 4C:
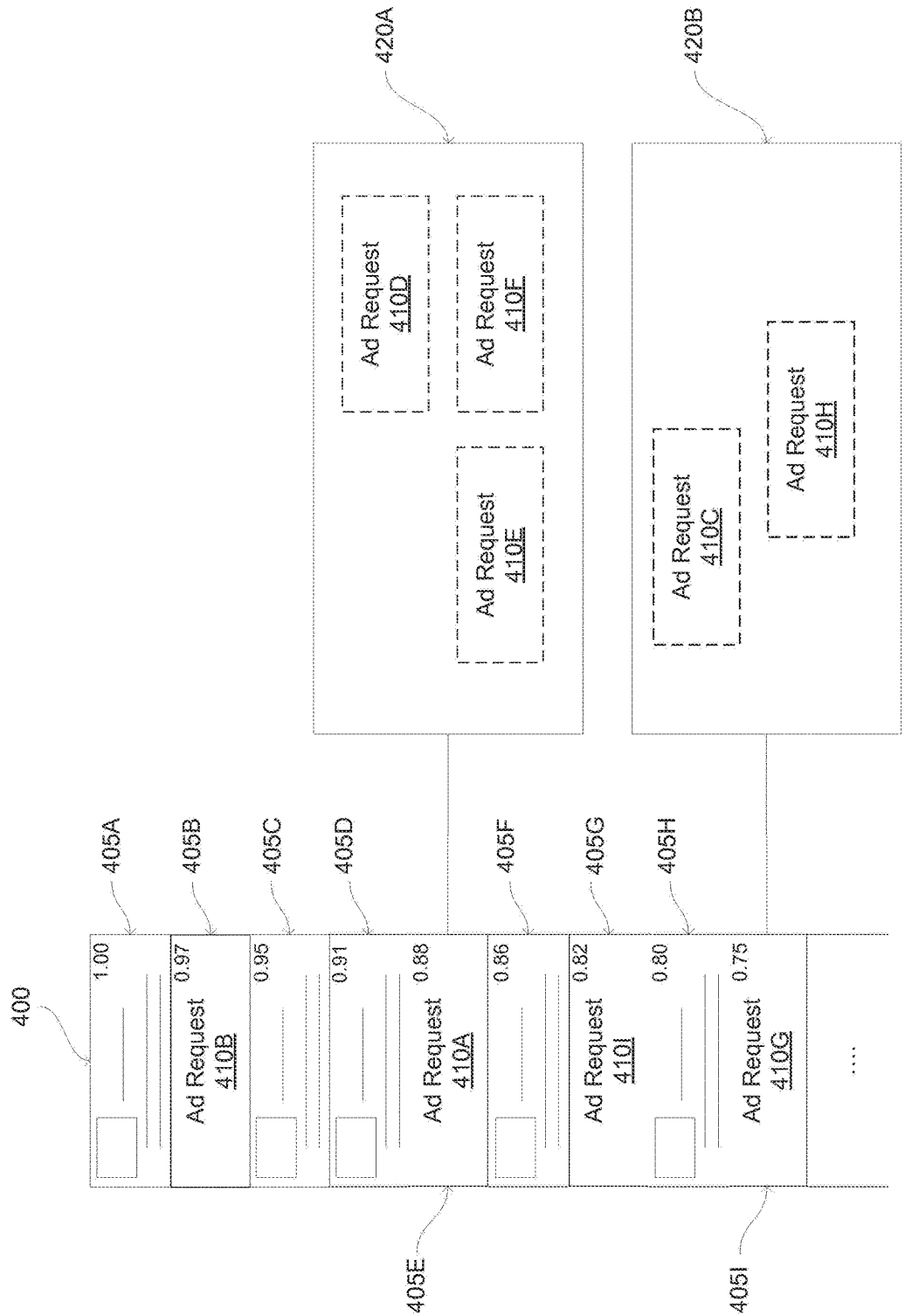
FIG. 4C is an example feed of content including scrollable content units each associated with a set of candidate advertisement requests for presentation, in accordance with an embodiment.

For example, in FIGS. 4B and 4C, enforcing advertisement policies results in positions 405B, 405E, 405G, 405I of the feed 400 being eligible for presenting advertisements. Hence, ad requests or sets of ad requests having the four highest scores are selected 320 by the social networking system 140 for presentation in positions 405B, 405E, 405G, 405I. In some embodiments, ad requests or sets of ad requests with larger scores are placed in positions that are nearer to a reference position (e.g., a top) of the feed 400. FIG. 4C shows an example feed 400 with ad requests and sets of candidate ad requests associated with positions 405 of the feed 400. In the example of FIG. 4C, ad request 410B is associated with position 405B, set of candidate ad requests 420A is associated with position 405E, ad request 410I is associated with position 405G, and set of candidate ad requests 420B is associated with position 405I. As described above in conjunction with FIG. 2, the ad requests 410 and sets of candidate ad requests 420B are ranked based on their associated scores, with the ad requests 410 or sets of candidate ad requests 420B having the highest four positions in the ranking selected 320 and associated with positions 405 in the feed 400.

If the social networking system 140 selects 320 a set of candidate ad requests for inclusion in the feed, the social networking system 140 scores 325 candidate ad requests in the set other than the initial candidate ad request. While the social networking system 140 determines an advertisement from the initial ad request is presented in a display area or the scrollable content unit associated with the set of candidate ad requests, the order in which advertisements from remaining candidate ad requests in the set is undetermined when the set of candidate ad requests is selected 320 for inclusion in the feed. In some embodiments, the social networking system 140 uses bid amounts of candidate ad requests in the set as scores for the candidate ad requests and determines 330 an order for the candidate ad requests in the set based on their bid amounts, so candidate ad requests having higher positions in the order have larger bid amounts. Alternatively, the social networking system 140 combines a bid amount of a candidate ad request in the set and a measure of relevance of the candidate ad request to the user, as further described above in conjunction with FIG. 2, to determine a score for the candidate ad request in the set. The social networking system associates the candidate ad requests with positions in the scrollable content unit associated with the set of candidate ad requests so candidate ad requests with higher positions in the order are associated with positions of the scrollable content unit closer to the display area when the scrollable content unit is initially presented.

In other embodiments, the social networking system 140 associates a discount factor with each position in the scrollable content unit associated with the selected set of candidate ad requests. A discount factor associated with a position in the scrollable content unit and reflects a predicted decrease in user interaction with a content item presented in the position of the scrollable content unit. The social networking system 140 determines the discount factors associated with various positions in the scrollable content unit based at least in part on prior interactions by the user with content items previously presented in different positions of other scrollable content units. Additionally, interactions by other users (e.g., users connected to the user) with content items presented in different positions of scrollable content units may also be used by the social networking system 140 to determine discount factors associated with position in the scrollable content unit associated with the set of candidate ad requests. When the scrollable content unit of is presented to the user, the likelihood of the user interacting with a content item (e.g., an advertisement) presented via scrollable content unit varies depending on the position in the scrollable content unit in which the content item is presented. Positions of the scrollable content unit may be determined based on a distance between a position and the display area of the scrollable content unit when the scrollable content unit is initially presented. For example, the user has a higher likelihood of interacting with content items presented in positions closer to the display area of the scrollable content unit when the scrollable content unit is initially presented than of interacting with content items presented in positions farther from the display area of the scrollable content unit when the scrollable content unit is initially presented. Hence, the position discount associated with a position in the scrollable content unit may be based at least in part on a distance between the position and the display area of the scrollable content unit when the scrollable content unit is initially presented. Discount factors associated with positions in the scrollable content unit may be determined similar to the position discounts associated with positions in the feed, as further described in U.S. patent application Ser. No. 14/049,429, filed on Oct. 9, 2013, and in U.S. patent application Ser. No. 14/675,009, filed on Mar. 31, 2015, which are each hereby incorporated by reference in their entirety.

The social networking system 140 may account for discount factors as well as scores of candidate ad requests in the set when determining 330 the order of the candidate ad requests, other than the initial ad request, in the set. For example, the social networking system 140 applies a discount factor associated with a position in the scrollable content unit corresponding to a position in an order of the candidate ad requests in the set and aggregates the scores after application of the discount factors. As an example, a discount factor associated with a first position in the scrollable content unit from the display area is applied to a score of a candidate ad request having a first position in the order, and a discount factor associated with a fourth position in the scrollable content unit from the display area is applied to a score of a candidate ad request having a fourth position in the order. The social networking system 140 determines an aggregated score for various orders of the candidate ad request in the set based on the scores of the candidate ad requests in the set and the discount factors associated with different positions in the scrollable ad unit and determines 330 an order of the set of candidate ad requests resulting in a maximum aggregated score. Determining an order of the set of candidate ad requests resulting in the maximum aggregated score allows the social networking system 140 to order the set of candidate ad requests to maximize an amount of compensation the social networking system 140 receives form advertisers associated with candidate ad requests in the set.

Figure 4D:
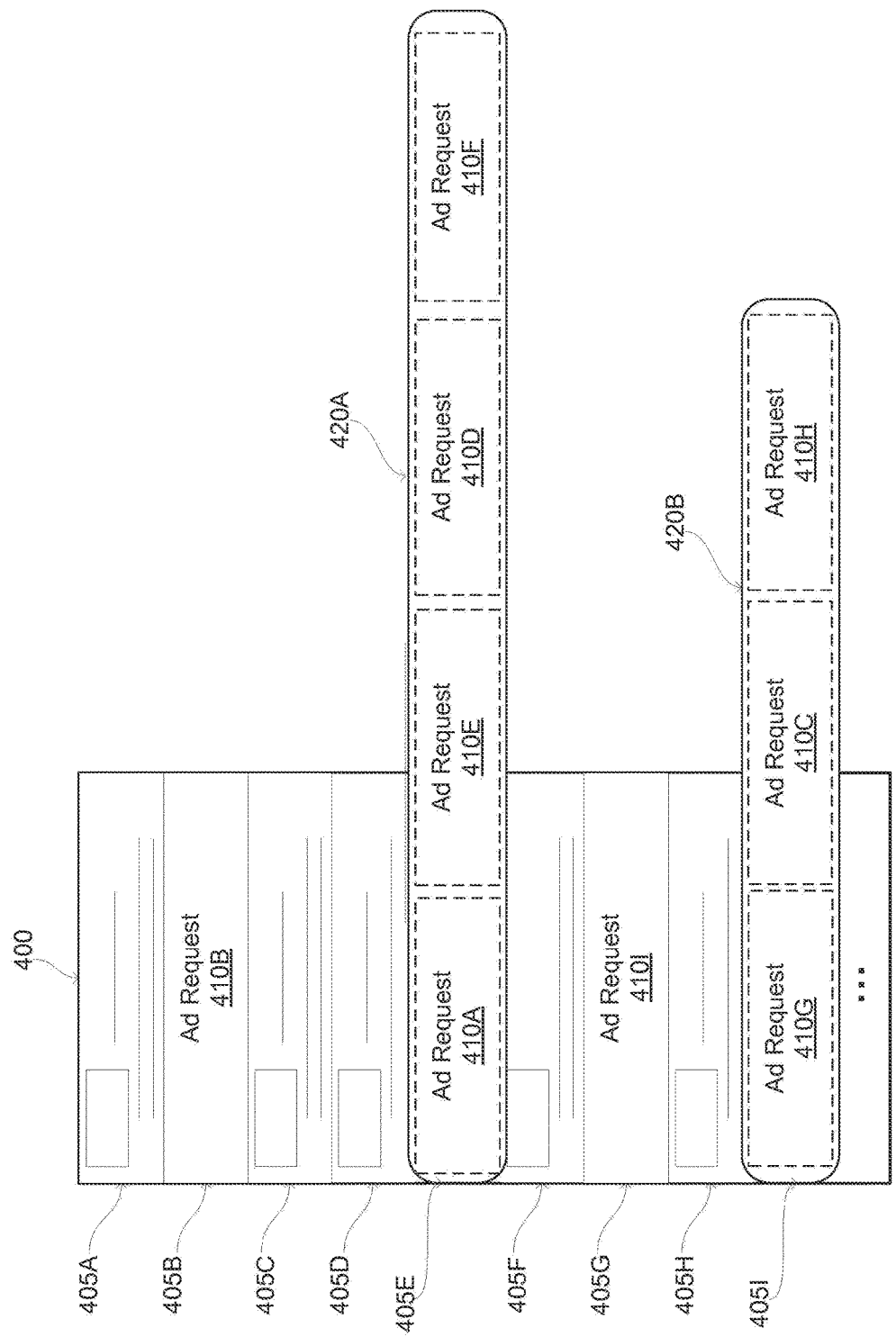
FIG. 4D is an example feed of content including scrollable content units associated with ordered sets of candidate advertisement requests for presentation, in accordance with an embodiment.

Referring to FIG. 4D, an example feed including scrollable content units associated with ordered sets of candidate ad requests is shown. As described above, ad request 410A is the initial ad request in set of candidate ad requests 420A, and FIG. 4D shows an example where the remaining ad request in the set or candidate ad requests 420A have an order of ad request 410E, ad request 410D, and ad request 410F. Based on this order, ad request 410E is associated with a position in a scrollable content unit adjacent to the display area of the scrollable content unit, which initially displays an advertisement from ad request 410A. Similarly, set of candidate ad requests 420B has ad request 410G as its initial ad request, with the remaining candidate ad requests in the set of candidate ad requests 420B having an order of ad request 410C and ad request 410H. Hence, ad request 410H is associated with a position in a scrollable content unit that is two positions from the display area of the scrollable content unit, which corresponds to the position of ad request 410H in the order of set of candidate ad requests 420B. As described above, the ordering of candidate ad requests within a set of candidate ad requests may be based on discount factors associated with positions in a scrollable content unit corresponding to various positions in an order as well as bid amounts associated with various candidate ad requests in the set of candidate ad requests.

In additional to selecting 320 content for inclusion in the feed and determining 330 an order for candidate ad requests in a set of candidate ad requests associated with a scrollable content unit selected 320 for inclusion in the feed, the social networking system 140 also determines a price charged to advertisers associated with candidate ad requests in the set of candidate ad requests associated with the scrollable content unit included in the feed. For the initial ad request that includes the advertisement initially presented by the display area of the scrollable content unit, the price charged to the advertiser associated with the initial ad request based on the adjustment value and bid amounts of one or more ad requests having lower positions in the ranking used to select 320 content for inclusion in the feed. In various embodiments, the social networking system 140 determines an amount based on one or more bid amounts of ad requests having lower positions in the ranking used to select 320 content for the feed than the set of candidate ad requests then removes the adjustment value from the determined amount to determine the price charged to the advertiser associated with the initial ad request. For example, if the adjustment value is a percentage used to increase the bid amount of the initial ad request, the social networking system 140 determines a factor to remove the adjustment value, such as the inverse of one plus the adjustment value, and applies the factor to an amount determined from bid amounts of ad requests having lower positions in the ranking used to select 320 content for the feed than the set of candidate ad requests including the initial ad request. The price charged to the advertiser associated with the initial ad request is then a product of the amount determined from the bid amounts of ad requests having lower positions in the ranking user to select 320 content for the feed and the factor to remove the adjustment value. In some embodiments, the amount determined from the bid amounts of the ad requests having lower positions in the ranking used to select 320 content for the newsfeed is a bid amount of an ad request or set of ad requests having a next-highest position in the ranking used to select content for the newsfeed than the position of the set of candidate ad requests.

To determine a price charged to an advertiser associated with a candidate ad request in the set of candidate ad requests other than the initial ad request, the social networking system 140 determines a remaining amount based on the adjustment value and the amount determined from the bid amounts of one or more ad request having lower positions in the ranking for selecting 320 content for the feed. For example, the remaining amount is a product of the amount determined from the bid amounts of one or more ad request having lower positions in the ranking for selecting 320 content for the feed and a ratio of the adjustment value to the factor for removing the adjustment value. As an example, the adjustment value is a percentage and the factor for removing the adjustment value is an inverse of one plus the adjustment value. The social networking system 140 allocates the remaining amount among the candidate ad requests in the set of candidate ad requests based at least in part on bid amounts associated with the candidate ad requests in the set. In one embodiment, to determine a price charged to an advertiser associated with a candidate ad request in the set, the social networking system 140 determines a product of the bid amount of the candidate ad request and a discount factor of a position in the scrollable content unit corresponding to a position in the order of the set of candidate ad requests associated with the candidate ad request and determines a ratio of the product to a sum of bid amounts of candidate ad requests in the set of candidate ad requests modified by discounts factors corresponding to positions in the scrollable ad unit corresponding to positions of the candidate ad requests in the set. The social networking system 140 determines the price charged to the advertiser associated with the bid amount as a product of the remaining amount and the determined ratio.

For example, in FIG. 4D, the bid amount of ad request 410A is $0.80 and the adjustment value is 50%, so the score for the set of candidate ad requests 420A is $1.20, as described above. If an ad request 410 or set of candidate ad requests 420 having a lower position (e.g., a next lower position than the position of the set of candidate ad requests 420A) in a ranking used to select 320 content for the feed has a bid amount, or a score, of $1.05, the social networking system determines a price charged to an advertiser associated with ad request 410A by determining a factor removing the adjustment value of 1/(1+0.5), and applying the determined factor to the bid amount of $1.05. Hence, in this example, the price charged to the advertiser associated with ad request 410A is ($1.05)(1/1.5), or $0.70. To determine prices charged to advertisers associated with the remaining ad requests in the set of candidate ad requests 420, the social networking system 140 determines a remaining amount based on a ratio of the adjustment value and the factor removing the adjustment value and the bid amount of the ad request 410 or set of candidate ad requests 420 having a lower position than the set of candidate ad requests 420A. In the example of FIG. 4D, the remaining amount is ($1.05)(0.5/1.5), or $0.35. Based on bid amounts associated with ad request 410D, ad request 410E, and ad request 410F, the social networking system allocates the remaining amount advertisers associated with ad request 410D, ad request 410E, and ad request 410F. For example, if ad request 410D has a bid amount of $0.75, ad request 410E has a bid amount of $0.95, and ad request 410F has a bid amount of $0.50, the social networking system 140 determines a price charged to an advertiser associated with ad request 410E as a product of the remaining amount and a ratio of the bid amount of ad request 410E to a total of the bid amounts of ad request 410E, ad request 410D, and ad request 410F. In this example, the price charged to the advertiser associated with ad request 410E is ($0.35)[$0.95/($0.75+$0.95+$0.50)], or $0.15. However, in other embodiments, the social networking system 140 applies discount factors to bid amounts of ad request 410E, ad request 420D, and ad request 410F corresponding to their positions in the order of candidate ad requests in the set, so the price charged to the advertiser associated with ad request 410E is a product of the remaining price and a ratio of the bid amount of ad request 410E weighed by a discount factor corresponding to the position of ad request 410E in the set of candidate ad request to a total of the bid amounts of ad request 410E, ad request 410D, and ad request 410F, each weighted by a discount factor corresponding to the position of the ad requests 410 in the order.

The social networking system 140 provides the feed including one or more scrollable content units associated with the selected sets of candidate ad requests that present advertisements from the sets of candidate ad requests. As the user interacts with a scrollable content unit associated with a set of candidate ad requests, the scrollable content unit modifies the advertisement presented in its display area, allowing the display area to present different advertisements from the set of candidate ad requests based on the order determined for the set. T The scrollable content unit may scroll through advertisements included in ad requests in the set of ad requests in a direction that is orthogonal to an orientation of the feed. For example, in FIG. 4D, the feed 400 is vertically, so a scrollable content unit associated with set of candidate ad requests 420A is scrollable in a horizontal direction to allow the user to view advertisements form ad requests 410A, 410E, 410D, 410F in the display area of the scrollable content unit.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A device comprising:
one or more processors; and
at least one memory storing instructions, that when executed by the one or more processors, cause the device to:
receive a request for displaying a feed of content in a graphical user interface of a social networking system for a user device associated with a user of the social networking system, the feed of content comprising multiple slots and scrollable in a first direction for displaying multiple content items;
identify candidate advertisement requests (ad requests) eligible for inclusion in the feed of content, each candidate ad request comprising an advertisement and a bid amount;
select, from the candidate ad requests, a set of two or more advertisements eligible for inclusion in a scrollable content unit for presentation in the feed of content, the scrollable content unit comprising a display area fit to occupy one of the multiple slots in the feed of content, the display area being a first portion of an entire area occupied by the feed of content, the entire area of the feed of content comprising a second portion occupied by one or more other slots in the feed of content, wherein the display area of the scrollable content unit (i) is configured to initially display advertisements fewer than all advertisements in the set, (ii) is scrollable in a second direction different from the first direction, (iii) is scrollable while the second portion of the entire area occupied by the feed of content remains spatially stationary;
compute an expected amount of interaction by the user with the scrollable content unit, wherein an entire order of advertisements in the scrollable content unit in which the advertisements are spatially arranged in the scrollable content unit is undetermined in an instance in which the expected amount of interaction is computed;
select a slot of the multiple slots in the feed of content for displaying the scrollable content unit based at least in part on the expected amount of interaction;
select other content items to occupy other slots in the feed of content for display;
determine a score associated with each advertisement in the set for inclusion in the scrollable content unit based at least in part on the bid amounts of the candidate ad requests associated with the advertisements in the set for inclusion in the scrollable content unit;
determine the entire order of the advertisements in the set in which the advertisements are spatially arranged in the scrollable content unit based at least in part on the scores associated with the advertisements in the set; and
present the feed of content in the graphical user interface with the scrollable content unit positioned at the selected slot and with the advertisements arranged in the scrollable content unit in the order determined, wherein select the slot of the multiple slots in the feed of content for displaying the scrollable content unit is further based on one or more advertising policies, the one or more advertising policies comprise (i) preventing presentation of the scrollable content unit in one or more specific slots in the feed of content, (ii) setting a minimum number of non-advertisement content items presented in the feed of content between the scrollable content unit and another advertisement, or (iii) setting a minimum distance of slots between the scrollable content unit and another advertisement.

2. The device of claim 1, wherein execution of the instructions by the processor further causes the device to select the slot of the multiple slots in the feed of content for displaying the scrollable content unit by:
   selecting initial advertisements for display initially in the display area of the scrollable content unit; and
   computing an adjustment value based at least in part on prior interactions by the user with the initial advertisements.

3. The device of claim 2, wherein execution of the instructions by the processor further causes the device to select the slot of the multiple slots in the feed of content for displaying the scrollable content unit by:
   selecting the slot for the scrollable content unit based at least in part on the adjustment value.

4. The device of claim 2, wherein the adjustment value comprises a percentage and the expected amount of interaction by the user with the scrollable content unit is scaled by the percentage.

5. The device of claim 2, wherein execution of the instructions by the one or more processors further causes the device to:
   determine prices to charge advertisers associated with the initial advertisements based at least in part on the adjustment value and bid amounts associated with the ad requests associated with the initial advertisements.

6. The device of claim 5, wherein execution of the instructions by the processor further causes the device to determine the prices to charge the advertisers associated with the initial advertisements by:
   determining a factor to remove the adjustment value.

7. The device of claim 6, wherein execution of the instructions by the processor further causes the device to determine the prices to charge the advertisers associated with the initial advertisements by:
   determining the prices to charge the advertisers associated with the initial advertisements by applying the determined factor to the bid amounts associated with the ad requests associated with the initial advertisements.

8. The device of claim 1, wherein execution of the instructions by the processor further causes the device to select the set of two or more advertisements eligible for inclusion in the scrollable content unit for presentation in the feed of content by:
   identifying candidate ad requests having a common characteristic; and
   including the advertisements associated with the identified candidate ad requests in the set.

9. The device of claim 1, wherein execution of the instructions by the processor further causes the device to select the set of two or more advertisements eligible to be included in the scrollable content unit for presentation in the feed of content by:
   identifying the set of the two or more advertisements based on one or more characteristics of the two or more advertisements and prior interactions by the user with the two or more advertisements.

10. The device of claim 1, wherein execution of the instructions by the processor further causes the device to determine the entire order of the advertisements in the set in which the advertisements are spatially arranged in the scrollable content unit based on discount factors of positions within the scrollable content unit, wherein a discount factor associated with a position is based on a distance between the position and the display area of the scrollable content unit.

11. A system comprising:
   a plurality of user devices configured to communicate with at least one computing device; and
   the at least one computing device configured to:
      receive a request for displaying a feed of content in a graphical user interface of a social networking system for a user device, of the plurality of user devices, associated with a user of the social networking system, the feed of content comprising multiple slots and scrollable in a first direction for displaying multiple content items;
      identify candidate advertisement requests (ad requests) eligible for inclusion in the feed of content, each candidate ad request including an advertisement and a bid amount;
      select, from the candidate ad requests, a set of two or more advertisements eligible for inclusion in a scrollable content unit for presentation in the feed of content, the scrollable content unit comprising a display area fit to occupy one of the multiple slots in the feed of content, the display area being a first portion of an entire area occupied by the feed of content, the entire area of the feed of content comprising a second portion occupied by one or more other slots in the feed of content, wherein the display area of the scrollable content unit (i) is configured to initially display advertisements fewer than all advertisements in the set, (ii) is scrollable in a second direction different from the first direction, (iii) is scrollable while the second portion of the entire area occupied by the feed of content remains spatially stationary;
      compute an expected amount of interaction by the user with the scrollable content unit, wherein an entire order of advertisements in the scrollable content unit in which the advertisements are spatially arranged in the scrollable content unit is undetermined in an instance in which the expected amount of interaction is computed;
      select a slot of the multiple slots in the feed of content for displaying the scrollable content unit based at least in part on the expected amount of interaction;
      select other content items to occupy other slots in the feed of content for display;
      determine a score associated with each advertisement in the set for inclusion in the scrollable content unit based at least in part on the bid amounts of the candidate ad requests associated with the advertisements in the set for inclusion in the scrollable content unit;
      determine the entire order of the advertisements in the set in which the advertisements are spatially arranged in the scrollable content unit based at least in part on the scores associated with the advertisements in the set; and
      present the feed of content in the graphical user interface with the scrollable content unit positioned at the selected slot and with the advertisements arranged in the scrollable content unit in the order determined, wherein select the slot of the multiple slots in the feed of content for displaying the scrollable content unit is further based on one or more advertising policies, the one or more advertising policies comprise (i) preventing presentation of the scrollable content unit in one or more specific slots in the feed of content, (ii) setting a minimum number of non-advertisement content items presented in the feed of content between the scrollable content unit and another advertisement, or (iii) setting a minimum distance of slots between the scrollable content unit and another advertisement.

12. The system of claim 11, wherein select the slot of the multiple slots in the feed of content for displaying the scrollable content unit comprises:

selecting initial advertisements for display initially in the display area of the scrollable content unit; and computing an adjustment value based at least in part on prior interactions by the user with the initial advertisements.

13. The system of claim 12, wherein select the slot of the multiple slots in the feed of content for displaying the scrollable content unit further comprises:

selecting the slot for the scrollable content unit based at least in part on the adjustment value.

14. The system of claim 12, wherein the adjustment value comprises a percentage and the expected amount of interaction by the user with the scrollable content unit is scaled by the percentage.

15. The system of claim 12, wherein the computing device is further configured to:

determine prices to charge advertisers associated with the initial advertisements based at least in part on the adjustment value and bid amounts associated with the ad requests associated with the initial advertisements.

16. The system of claim 15, wherein determine the prices to charge advertisers associated with the initial advertisements comprises:

determining a factor to remove the adjustment value.

17. The system of claim 16, wherein determine the prices to charge advertisers associated with the initial advertisements further comprises:

determining the prices to charge the advertisers associated with the initial advertisements by applying the determined factor to the bid amounts associated with the ad requests associated with the initial advertisements.

18. The system of claim 11, wherein select the set of two or more advertisements eligible to be included in the scrollable content unit for presentation in the feed of content comprises:

identifying candidate ad requests comprising a common characteristic; and including the advertisements associated with the identified candidate ad requests in the set.

19. The system of claim 11, wherein select the set of two or more advertisements eligible to be included in the scrollable content unit for presentation in the feed of content comprises:

identifying the set of the two or more advertisements based on one or more characteristics of the two or more advertisements and prior interactions by the user with the two or more advertisements.

20. The system of claim 11, wherein the computing device is configured to determine the entire order of the advertisements in the set in which the advertisements are spatially arranged in the scrollable content unit based on discount factors of positions within the scrollable content unit, wherein a discount factor associated with a position is based on a distance between the position and the display area of the scrollable content unit.

* * * * *